United States Patent
Earley et al.

(10) Patent No.: US 11,913,810 B2
(45) Date of Patent: Feb. 27, 2024

(54) SPIRIT LEVEL

(71) Applicant: STAFF HOLDINGS PTY LTD, Melbourne (AU)

(72) Inventors: Ross Earley, Melbourne (AU); Jason Andrew Byron, Melbourne (AU)

(73) Assignee: STAFF HOLDINGS PTY LTD, Melbourne (AU)

( * ) Notice: Subject to any disclaimer, the term of this patent is extended or adjusted under 35 U.S.C. 154(b) by 119 days.

(21) Appl. No.: 17/767,493

(22) PCT Filed: Oct. 12, 2020

(86) PCT No.: PCT/AU2020/051094
§ 371 (c)(1),
(2) Date: Apr. 8, 2022

(87) PCT Pub. No.: WO2021/068041
PCT Pub. Date: Apr. 15, 2021

(65) Prior Publication Data
US 2023/0251086 A1    Aug. 10, 2023

(30) Foreign Application Priority Data

Oct. 11, 2019    (AU) ................. 2019903828

(51) Int. Cl.
*G01C 9/28*    (2006.01)
*G01C 9/34*    (2006.01)

(52) U.S. Cl.
CPC ....... *G01C 9/28* (2013.01); *G01C 9/34* (2013.01)

(58) Field of Classification Search
CPC .................................... G01C 9/28; G01C 9/34
(Continued)

(56) References Cited

U.S. PATENT DOCUMENTS 3,589,021 A * 6/1971 Hall, Sr. ............... A61B 5/1071
33/372
4,168,578 A * 9/1979 VanderWerf ............. G01C 9/28
33/382
(Continued)

FOREIGN PATENT DOCUMENTS

WO    WO2005005925 A1    1/2005

OTHER PUBLICATIONS

Stabila Type 196-2 LED spirit level Illuminated vials for optimum readability, https://www.stabila.com/en/products/details/type-196-2-led-spirit-level.html Germany.
(Continued)

*Primary Examiner* — George B Bennett
(74) *Attorney, Agent, or Firm* — Larson & Larson; Frank Liebenow; Justin P. Miller (57) ABSTRACT

A device 1 mountable to an upright ST. The device comprises a body 3 and an arm 5. The body is reversible relative to the upright, about an upright axis, from a first orientation to a second orientation. The body comprises first contacting portions 3a (arranged to contact a front of the upright when the body is in the first orientation) and second contacting portions 3b (arranged to contact a front of the upright when the body is in the second orientation). The arm is movable relative to the body from a first position (in which the arm extends rearwardly beyond the first contacting portions to pass one side of the upright and engage a rear of the upright) to a second position (in which the arm extends rearwardly beyond the second contacting portions to pass another side of the upright and engage the rear of the upright).

20 Claims, 4 Drawing Sheets (58) Field of Classification Search
USPC .................. 33/347, 370, 371, 372, 373, 379
See application file for complete search history.

(56) References Cited

U.S. PATENT DOCUMENTS

| | | | | |
|---|---|---|---|---|
| 5,815,937 | A | 10/1998 | Glorioso | |
| 6,029,359 | A * | 2/2000 | Szumer | G01C 9/28 33/465 |
| 6,131,298 | A * | 10/2000 | McKinney | G01C 9/28 33/372 |
| 6,332,277 | B1 * | 12/2001 | Owoc | G01C 9/28 33/373 |
| 6,389,709 | B1 * | 5/2002 | Lunde | G01C 5/00 33/768 |
| 6,502,322 | B2 * | 1/2003 | Smochek | G01C 9/26 33/373 |
| 6,834,435 | B2 * | 12/2004 | Turner | G01C 9/28 33/529 |
| 7,562,462 | B2 * | 7/2009 | Gentleman | G01C 9/28 33/372 |
| 7,644,506 | B2 * | 1/2010 | Wong | G01C 9/28 33/373 |
| 9,885,571 | B2 * | 2/2018 | Hoppe | G01C 9/34 |
| 11,293,740 | B1 * | 4/2022 | Mieir | G01B 3/004 |
| 11,415,413 | B2 * | 8/2022 | Cook | G01C 9/34 |
| 11,536,566 | B2 * | 12/2022 | Haas | H02G 1/00 |
| 2007/0193048 | A1 | 8/2007 | Molitorisz | |
| 2010/0058601 | A1 | 3/2010 | Bohman | |
| 2022/0003343 | A1 * | 1/2022 | Tooley | F16L 23/003 |
| 2022/0381560 | A1 * | 12/2022 | Haas | G01P 1/00 |

OTHER PUBLICATIONS

Youtube video Stabila Type 196-2, Tech Digital Electronic IP65 Levels: https://www.youtube.com/watch?v=BtxmifKHFjY.

* cited by examiner

SPIRIT LEVEL

CROSS REFERENCE TO RELATED APPLICATIONS

This application is a national entry of International Application No. WO 2021/068041, filed on Oct. 12, 2020, which claims priority to and benefits of Australian Patent Application No. 2019903828 filed Oct. 11, 2019, both of which are incorporated herein by reference.

FIELD OF THE INVENTION

Various aspects of the invention relate to spirit levels, although various aspects of the technologies disclosed herein may be usefully applied in other contexts.

BACKGROUND TO THE INVENTION

A spirit level is a device for measuring the orientation of an object. Historically spirit levels have comprised a planar face, placeable against the target object, and an orientation-signaling vial for signaling an indication of the orientation of the target object. Conventionally, the vial is transparent, has a slightly curved interior and is mostly, but not completely, filled with liquid leaving a gas bubble. The position of the gas bubble along the curved interior visually signals the orientation of the target object. Some spirit levels have two mutually perpendicular vials to be alternately used for righting and levelling operations. Various modern spirit levels comprise electronic orientation sensing devices (e.g. accelerometers) and associated signalers to supplement or replace the one or more vials.

Figure 1:
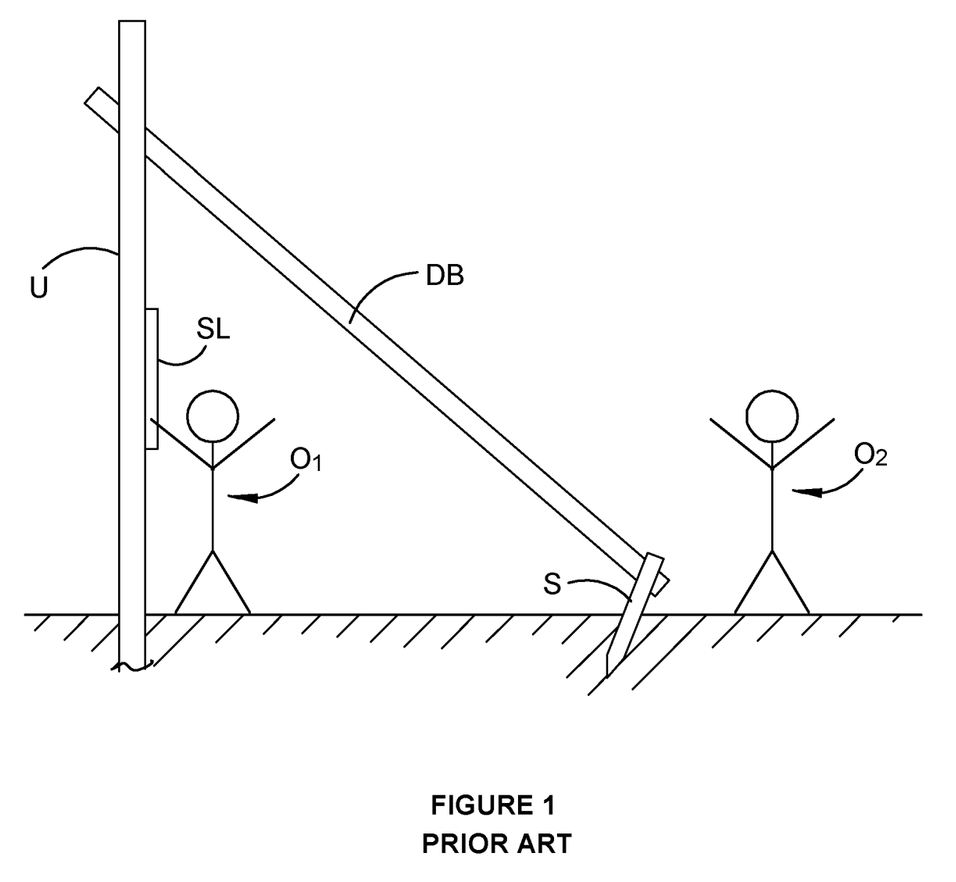
FIG. 1 schematically illustrates a conventional righting operation.

FIG. 1 illustrates a prior art method of righting an upright U. Operator $O_1$ holds the spirit level SL against the front of the upright U and relays messages to a second operator $O_2$. A diagonal brace DB extends forwards and down from the upright U to cross a stake S secured into the ground.

In response to the messages from operator $O_1$, operator $O_2$ manipulates the diagonal brace DB, e.g. if operator $O_1$ signals that the upright U is leaning forward, operator $O_2$ might give the lower end of the diagonal brace DB a few taps with a hammer to straighten the upright. Once the upright is righted the diagonal brace can then be secured to the stake S, e.g. with the aid of a nail gun.

Such an approach is routinely used for example when setting fence posts, e.g. the diagonal brace DB might be taken away once a concrete footing of the upright U has set. A similar method is routinely utilised for uprighting stud walls in which case an individual stud of the wall is the upright U and the diagonal brace DB may be taken away after the stud wall has been fixed to adjoining walls etc.

The present inventors have recognised that this popular method has significant drawbacks. The need for two operators is inefficient particularly since in many construction contexts there is inefficiency associated with finding and interrupting a second operator to help.

U.S. Pat. No. 7,908,753 discloses a spirit level comprising an arm mounted to be pivoted outwardly against bias to hold a stud, between a reference surface of the spirit level and a stud-engaging portion of the arm, for hands-free operation. Nonetheless, the present inventors have recognised that further improvements are possible.

It would be highly desirable to reduce the above-described righting-operation to a one operator operation, to provide a spirit level (or other device) more able to hold onto an upright in the face of disturbances such as the aforementioned hammering and to provide a device that is conveniently storable.

Accordingly, various aspects of the invention aim to provide improvements in and for devices mountable to uprights and/or in and for righting uprights, or at least to provide useful alternatives for those concerned with such things.

It is not admitted that any of the information in this patent specification is common general knowledge, or that the person skilled in the art could be reasonably expected to ascertain or understand it, regard it as relevant or combine it in any way before the priority date.

SUMMARY

One aspect of the invention provides a device mountable to an upright;
the device comprising a body and an arm;
the body being reversible relative to the upright, about an upright axis, from a first orientation to a second orientation;
the body comprising
first contacting portions arranged to contact a front of the upright when the body is in the first orientation; and
second contacting portions arranged to contact a front of the upright when the body is in the second orientation;
the arm being movable relative to the body
from a first position in which the arm extends rearwardly beyond the first contacting portions to pass one side of the upright and engage a rear of the upright;
to a second position in which the arm extends rearwardly beyond the second contacting portions to pass another side of the upright and engage the rear of the upright; and
in each of the first position and the second position, the arm extending upwardly from the body and being movable relative to the body to enable a weight of the body to tension the arm.

The body is preferably an elongate body and upright when in each of the first orientation and the second orientation. Most preferably in each of the first position and the second position, the arm extends upwardly from the body and is movable, at least approximately about a horizontal axis, relative to the body to enable a weight of the body to tension the arm. The horizontal axis may be within a range of one sixth to one half (inclusive) of a length of the body from a top of the body.

Optionally the arm is movable to a storage position wherein substantially all of the arm is within the body.

Another aspect of the invention provides a device mountable to an upright;
the device comprising a body and an arm;
the body being an elongate body and comprising contacting portions arranged to contact a front of the upright;
the arm being movable relative to the body
from a first position wherein the arm
extends rearwardly beyond the contacting portions to pass one side of the upright and engage a rear of the upright; and
extends upwardly from the body and is movable, at least approximately about a horizontal axis, relative to the body to enable a weight of the body to tension the arm;

to a storage position wherein substantially all of the arm is within in the body; and the horizontal axis being within a range of one sixth to one half (inclusive) of a length of the body from a top of the body.

The device may comprise a member. An arm pivotal-connection by which the arm is mounted to pivot relative to the member may be provided. A member pivotal-connection by which the member is mounted to pivot relative to the body, about a horizontal fore-aft axis may also be provided. Preferably the arm pivotal-connection is above the member-pivotal connection. There may be a detent to fix the member pivotal-connection to hold arm-pivotal connection horizontal. The detent may be magnetic.

Optionally one or more resilient elements are associated with the arm-pivotal connection and arranged to be loaded when the arm is pivoted away from the body.

Preferably the arm and the member comprise features co-operable to axially load the one or more resilient elements when the arm is pivoted away from the body.

The arm may comprise a contact positioned to contact the rear of the upright and be in register with an upright centre of the body. The contact may be a spike. The arm may comprise a replaceable contact unit defining the contact, e.g. so the spike can be swapped out for a resilient (e.g. rubber) contact portion for gripping hard surfaces.

Preferably the body has a fore-aft outer dimension in the range of 50 mm to 100 mm inclusive. Most preferably the body has a transverse outer dimension in the range of 15 mm to 50 mm inclusive.

A stud receiving capacity of the device is preferably limited to studs having a fore-aft dimension of not more than about 152 mm.

The device may comprise a signaler for signaling an indication of an orientation of the upright.

Preferably the indication is interpretable by a user more than 1 metre in front of the upright.

Another aspect of the invention provides a device comprising
  a mounting arrangement for mounting the device on an upright; and
  a signaler for signaling, to a user in front of the upright, an indication of which of backwards and forwards the upright needs to be tilted to right the upright.

The signaler may be for visually signaling and/or audibly signaling.

Another aspect of the invention provides a method of righting an upright;
  the upright having the device mounted thereon;
  the method comprising moving, in response to the signaling, the upright.

Optionally the moving comprises manipulating a brace running forwards and down from the upright.

DETAILED DESCRIPTION OF THE EMBODIMENTS

FIG. 1 illustrates a device 1 in the form of a spirit level comprising a body 3 and an arm 5.

The body 3 is an elongate body. In this particular example, most of the body is formed of an aluminium extrusion although of course other materials and modes of construction are possible. The body 3 has a rectangular profile having a length (running in the fore-aft direction) of about 70 mm and a width of about 30 mm. A spirit level length of about 4 ft, say in the range of 1,100 mm to 1,300 mm inclusive, is a popular size.

Figures 2, 3, 4:
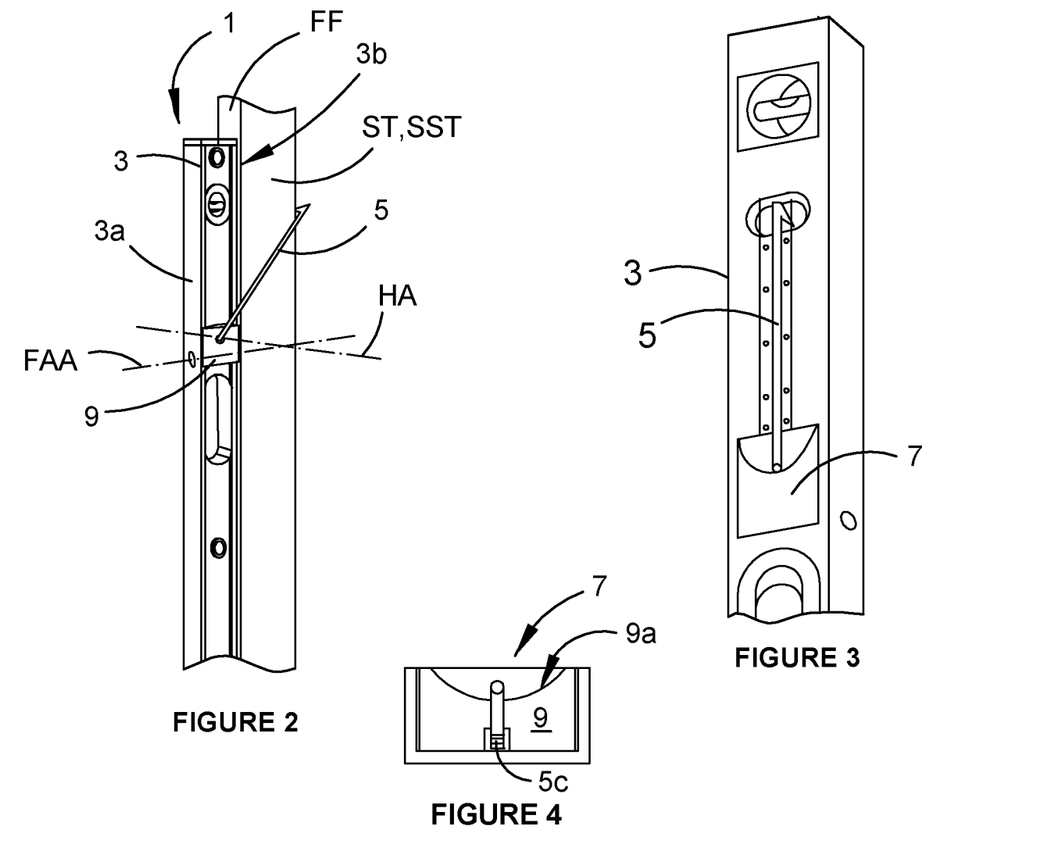
FIG. 2 is a perspective view of a spirit level mounted on an upright.
FIG. 3 is a perspective view of a portion of a spirit level.
FIG. 4 is a transverse cross section view corresponding to the line A-A in FIG. 3.

The body 3 has a planar front face 3a and a planar rear face 3b. FIG. 2 shows the planar rear face 3b in conformal contact with the planar front face FF of the stud ST whereby the body 3 is oriented with respect to the stud ST.

As the wording is used herein, the planar rear face 3b constitutes an infinity of contacting portions. Alternate contacting arrangements are possible. By way of example, three point-contact contacting portions would be sufficient to orient the body 3 relative to the stud ST.

The arm 5 is mounted to pivot with respect to the body 3 about a horizontal axis HA. The arm 5 has a return at its end defining a spike 5a for contacting and engaging a rear of the stud ST. A single spike is preferred although other forms of contact are possible, e.g. a set of spikes or a gripping pad might be used.

In the position illustrated in FIG. 2, the arm 5 extends rearwardly from the body 3 at an upward oblique angle to engage the rear of the stud ST. The spike 5a engages the rear of the stud ST whereby to some extent the weight of the body 3 hangs from the arm. This places the arm 5 in tension thereby tending to squeeze the stud ST between the body 3 and the spike 5a, essentially grasping the stud ST to mount the spirit level 1 on the stud ST.

The tension in the arm drives the spike 5a into engagement to enhance the hold at the rear of the stud ST, and a horizontal component of the, tension in the arm promotes frictional engagement between the rear 3b and the front FF.

Bearing in mind that all solid materials have some degree of elasticity, the distribution of horizontal force (and corresponding friction) along the body-stud interface 3b, FF is non-uniform and has a maxima in the vicinity of the pivot axis HA, i.e. in the vicinity of the root of the arm.

Positioning the pivot axis HA, and in turn this maxima, in the range of one third±one sixth of the length of the spirit level from the top of the spirit level has been found to lead to more secure mounting.

It has been found that when subject to disturbances (such as hammering in the course of a righting operation) the body 3 might swing about a fore-aft axis in the vicinity of the horizontal axis HA. By positioning this swinging point above the midpoint of the spirit level, the spirit level tends to hang stably. When subjected to other modes of disturbance, the spirit level can pivot about the top edge of the rear 3b. Spacing the pivot axis HA from this top edge gives the horizontal component of the tension in the arm leverage to control such movement.

Disturbances can also lead to the body 3 twisting about its lengthwise axis and in turn falling off the stud ST. To address this, the spike 5a (or other contact) is preferably positioned to sit in register with the upright central plane of the body 3.

In simple variants, the device 1 may have a simple pivotal mounting between the body 3 and arm 5 by which the arm 5 can swing freely when it is not engaged with the stud ST. That said, a freely swinging arm can be an irritation, e.g. when the spirit level is to be used for other (e.g. leveling) tasks. It can also get in the way when it comes time to store the spirit level and/or get damaged in the rough and tumble of a building site.

Figure 5:
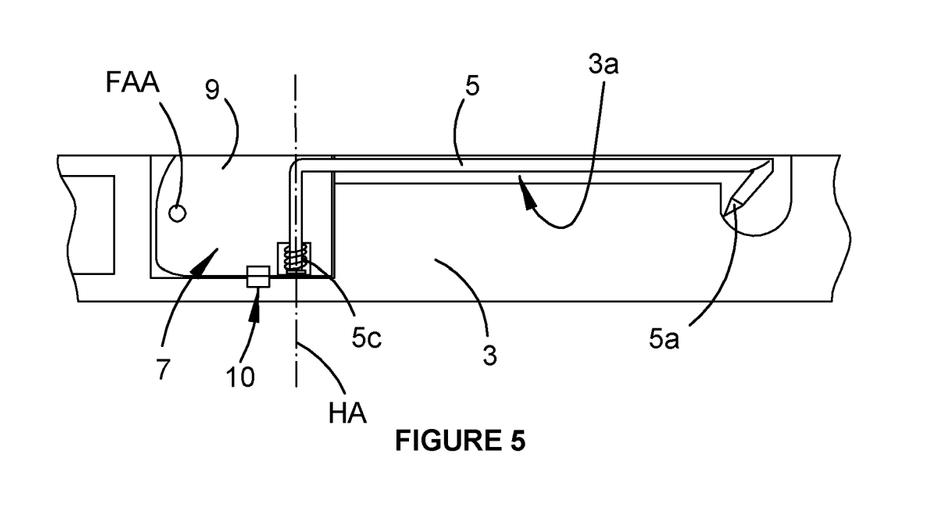
FIG. 5 is a lengthwise cross section view of a portion of the spirit level of FIG. 3.

FIGS. 3 to 5 illustrate a preferred mounting arrangement 7 by which the arm 5 is mounted to move relative to the body 3.

The mounting arrangement 7 comprises a member 9 in the form of a shaped block mounted to pivot about a fore-aft axis FAA. The arm 5 is in turn pivotally connected to the member 9.

The body 3 comprises an arm receiving space 3c which in this example comprises a lengthwise slot and an end formation for receiving the spike 5a.

FIG. 5 illustrates the arm 5 in its storage position at which the arm 5 is within (i.e. not protruding from) the rectangular profile of the body 3. In the storage position the arm is tucked away so as not to extend the packaging envelope of the body 3. It is also protected from damage. In other variants of the spirit level 5, the body 3 may have an I-beam profile. For the avoidance of doubt, the voids defined on each side of such a profile are within the body as such wording and similar wording are used herein. Typically, a body's packaging envelope has a profile corresponding to the smallest possible convex polygon embracing the profile of the body. Preferably the arm is stowable wholly within this envelope.

In the storage position the pivot axis HA, by which the arm 5 pivots relative to the member 9, is substantially perpendicular to the length of the body 3. A detent mechanism 10, which in this example takes the form of a magnetic detent mechanism, holds the member 9, and thus the arm 5, in this position.

When it comes time to mount the device 1 on a stud ST, the arm 5 may be grasped to lift it from the receiving space 3c by pivoting the block 9 about the axis FAA. The arm 5 can then be pivoted about the axis HA and placed behind the stud ST and maneuvered so that the member 9 resumes its position at which the axis HA is perpendicular to the body 3. The detent 10 re-engages to hold this relative orientation.

In preferred variants a bias mechanism is provided by which the arm 5 is biased about the axis HA towards the body 3. This leads to three-fold advantages. Firstly the bias provides a small degree of additional engagement with the stud ST. Secondly, the bias urges the arm towards a position in which the spike 5a sits against the rear 3b whereat it is not 'flapping around' so as to get in the way as much as it might otherwise. Thirdly the bias urges the spike 5a to engage the rear of the stud and thereby makes it easier to mount the device.

The preferred bias mechanism entails a cam portion 9a on an exterior of the member 9 and along which the arm rides as it is pivoted about the axis HA. The cam 9a converts pivotal motion to axial motion by which resilient elements, e.g. Belleville washers 5c, are compressed.

Another advantageous variant of the spirit level 1 does without the Belville washers 5c. Instead a magnetic arrangement is employed to hold the arm in its stowage configuration. A preferred variant of this magnetic arrangement incorporates two magnets spaced along the arm receiving-space 3c, preferably towards each end of the space 3c.

In this advantageous embodiment, when the arm is pulled away from these magnets the combination of the block pivoting about the axis FAA and the arm riding along the caming surface 9a ensures that the tip 5a clears the long corners of the spirit level 1 en route to its deployed position. In the deployed position, the arm swings freely without the washers 5 serving to bias it back towards the body.

The Figures illustrate but one example of the invention. Various other examples are possible. By way of example, whereas there is a pivotal connection between the body 3 and arm 5, there are other options. The arm 5 might have a resilient inward portion that is rigidly connected to the body 3 and resiliently deformable to enable the arm 5 to 'pivot' outwardly to engage the rear of the stud ST. Such movement is an example of the arm moving at least approximately about the horizontal axis HA as such wording, and similar wording, is used herein.

FIG. 2 shows the arm 5 extending around the stud side SST. The inventors have recognised that in some contexts, such as at the corner of a stud wall, this side of the stud might not be accessible. On the other hand, the alignment of uprights with respective inaccessible sides may be important, e.g. the alignment of the corner studs is important for the convenient and accurate attachment of plasterboard (dry wall). Accordingly, the spirit level 1 is reversible. Instead of pivoting the arm 5 rearwardly beyond the rear face 3b, the arm can be pivoted the other way beyond the front face 3a. By turning the spirit level 1a about its vertical axis, the front becomes the rear face for abutting the front face FF and the arm 5 can wrap around the other side of the stud ST.

A vertical separation between the axis FAA, HA stabilises the mounting arrangement by reducing the tendency of the member 9 to rotate about the axis FAA relative to the body 3 under the influence of the tension within the arm 5.

The vast majority of studs are within the range of 70 mm to 152 mm (6") in the fore-aft direction. 70 mm, 90 mm and 6" are common sizes. According to preferred variants, the device 1 has a stud receiving capacity limited to studs having a fore-aft dimension of not more than about 152 mm, e.g. not more than 155 mm. In this example, when the arm 5 is horizontal, to maximise this horizontal separation between the spike 5a and the rear 3b, there is just enough space to receive a 6" stud. When mounted onto such a 6" stud the arm 5 extends upwardly from the body at only a very shallow angle above horizontal. This leads to large tensile forces in the arm 5. When the same spirit level is applied to a smaller stud, the arm 5 extends at a more upright angle whereby the degree of tension is relatively lower. The inventors have found that an arm length selected to just fit over an about 6" stud works well on timber studs within the range of 70 mm to 6".

Of course, other sizes are possible, e.g. longer arms might be provided for heavier industrial applications.

Conventional signalers (e.g. vials) for signaling fore-aft inclination are typically viewable from the side of the spirit level rather than from in front of the spirit level. In contrast, preferred variants of the device 1 comprise signalers for signaling to an operator in front of the upright. One form of signaler may comprise one or more visual indicators (e.g. one or more lights such as LEDs) positioned to be viewed from directly in front of the stud so as to provide an operator at the lower end of a brace DB extending in the fore-aft vertical plane with information regarding the orientation of the upright. Audible signals are also possible, e.g. the device 1 might product a series of tones, or indeed the signals may take the form of speech.

A simple variant of the device 1 might comprise two different coloured lights flush or recessed within the face 3a (i.e. not proud of the face 3a), one light being operative to signal that the upright needs to be tilted back and the other light being illuminated to signal that the upright needs to be tilted forward. Preferably the signals provide an indication of the magnitude of the deviation from vertical. By way of example, a five-light variant may have two lights for respectively signaling when large fore-aft movements are required, two further lights for respectively indicating when smaller fore-aft movements are required and a single light that is illuminated to convey that the upright is sufficiently vertical. Again, similar information might be conveyed by audible signals.

Figures 6, 7, 8:
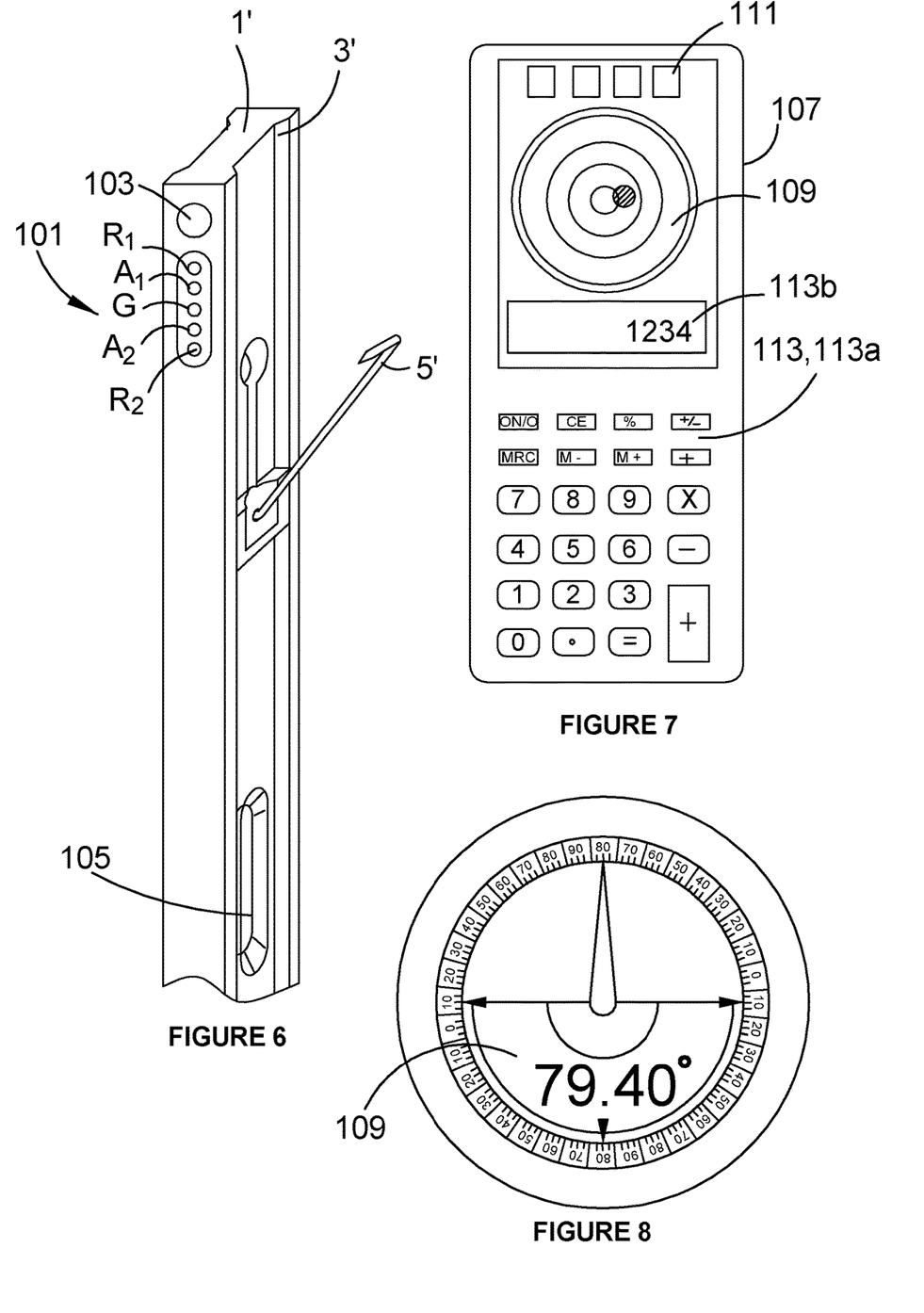
FIG. 6 is a perspective view of the spirit level.
FIG. 7 is a front view of an electronics unit.
FIG. 8 shows one display of the electronics unit.

FIG. 6 illustrates a preferred five-light variant of the spirit level. The spirit level 1' comprises a body 3', an arm 5', a handle 105 and a five-light array 101. The array 101 is an example of a visual orientation-signaler. Preferably each of the two long-narrow sides of the spirit level has a visual orientation signaler. More preferably each end of each of these two long sides has a visual orientation signaler.

The array 101 comprises five lights, e.g. five LEDs. In this example the array is a linear array and the central light of the array is a green light G. The green light G is bracketed by a pair of amber lights $A_1, A_2$ and those lights are in turn bracketed by a pair of red lights $R_1, R_2$.

In a preferred implementation, when righting the upright one of the red lights $R_1, R_2$ flashes if the upright is far away from vertical. As the upright is moved towards vertical, and threshold departures from vertical are passed, the adjacent amber light will begin blinking, with further movement the red light will extinguish, with yet further movement the green light will illuminate and with yet further movement the adjacent amber light will extinguish. This leaves the green light G as the only illuminated light thus signalling that the upright is vertical (within a predetermined tolerance). In this way the user is presented with simple intuitive indications of the magnitude and direction in which the upright needs to be moved. Additionally, or alternatively, a strobe rate of the flashing lights might be varied to convey information. Preferably the red lights $R_1, R_2$ flash at a faster rate than the amber lights $A_1, A_2$ which in turn flash at a lower rate than the green light. Most preferably the green light is constantly illuminated (corresponding to a flash rate of zero). Of course there are other ways in which strobe rate and/or duty cycle etc. might be varied to convey an indication of orientation in an intuitive fashion utilising inexpensive hardware (e.g. utilising LEDs). Through this intuitive interface the righting operation can be sped up and made easier. Operators can become used to the intuitive interface whereby an operator can instinctively move the upright swiftly to position as they watch visual (and/or other such as audio) signals change.

Audible signals can also assist, particularly in the context of bright sunlight where visual signals might be hard to make out and may also be implemented as an alternative to visual signals. For this purpose the spirit level may be equipped with a speaker 103.

More elaborate forms of signal are possible, e.g. a signaler might take the form of a Bluetooth device cooperable with an earpiece worn by the operator.

Preferably the spirit level also includes an electronics unit 107 which is preferably removably securable to the body 3'. Preferably it is securable with a socket opening from a long wide face of the body 3.

Most preferably the electronics unit 107 incorporates an orientation sensing arrangement (e.g. an accelerometer), a display 109,113b to facilitate operation of the unit 107 as a stand-alone orientation sensing and displaying unit, and a data outlet for conveying information to outputs such as the array 101 and/or the speaker 103.

A preferred variant incorporates the screen 109, mode buttons 111 and a calculator 113. In this case the calculator 113 comprises an array of buttons 113a and an LCD screen 113b although in other variants the screens 109,113b may be integrated.

The unit 107 has a size and form akin to a conventional calculator. In particular behind it's front face (shown in FIG. 7) carrying the buttons and displays, is a contacting portion (e.g. a planar surface or at least 3 co-planar points) by which the unit 107 can sit in abutment with a planar surface. The unit 107 has a bulls-eye mode selectable so that in this orientation the display 109 displays a bulls-eye output indicative of a deviation of the underlying planar surface from horizontal (as suggested in FIG. 7).

FIG. 8 illustrates the screen 109 in another mode in which an angle from horizontal is indicated. In a preferred variant the unit 107 automatically switches between modes in response to an orientation of the unit 107.

Figure 10:
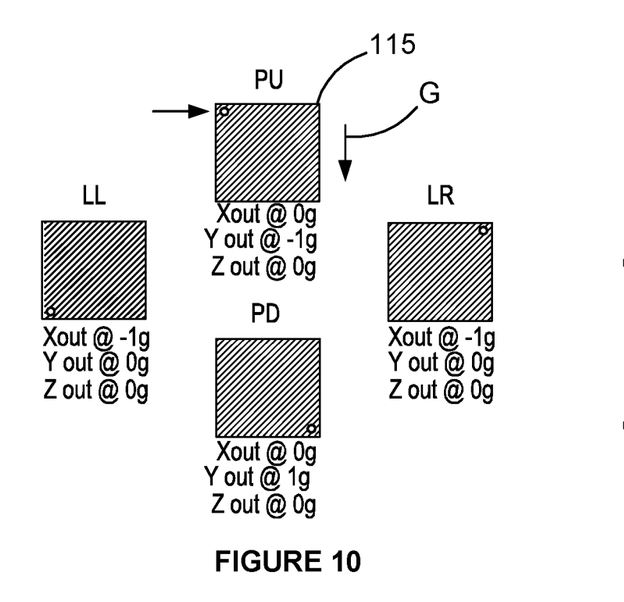
FIG. 10 is a top view of an accelerometer of the electronics unit of FIG. 7.
Figure 11:
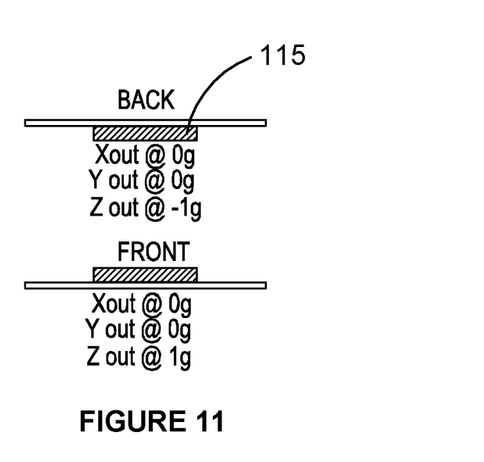
FIG. 11 is a side view of the accelerometer.

Preferably the unit 107 incorporates an accelerometer 115 to sense acceleration G due to gravity and thereby provide an indication of the orientation of the unit 107. FIGS. 10 and 11 illustrate potential outputs from the accelerometer 115 corresponding to portrait upright (PU), portrait down (PD), landscape left (LL), landscape right (LR), back (down) and front (down).

Figure 9:
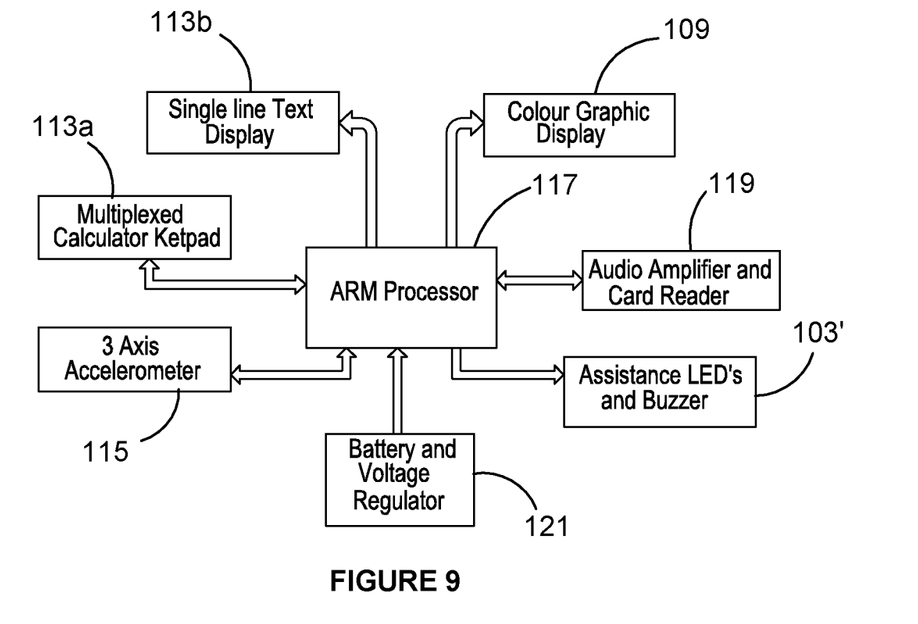
FIG. 9 is a schematic of the electronics of the spirit level of FIG. 6.

The accelerometer 115 is preferably a three-axis, capacitive, micro machined accelerometer. Most preferably it interfaces with an ARM controller 117 of the unit 107 to display the detected data and operate the calculator 113a, 113b.

Of course, one of ordinary skill in the art will appreciate that there are a variety of suitable orientation-sensing devices, (e.g. accelerometers) and signalers that may be utilised without difficulty in view of the disclosure herein.

As described above, preferred variants of the spirit level provide an LED indication on which way the device needs to be moved to bring it into a level position (or as the case may be, an upright position). In preferred variants along with this visual indication there is also provision for a pre-recorded voice prompt to assist the operator. This audio indication may be an alternative to the visual indication. Preferably the audio indication is provided by audio amplifier and card reader 119 built into the unit 107. The card stores the pre-recorded messages. The device 119 is connected to the ARM processor 111 via a serial connection. Via this connection, the processor 117 controls which of the pre-recorded messages should be played.

The messages will depend on the detected orientation of the unit 107. Common messages may include:

Tilt Forward
Tilt BackwardTilt Left
Tilt Right
Left Up
Right Up
Left Down
Right Down When righting an upright, the voice commands may correspond to each of the visual indications of the visual indications described in respect of the array 101.

Most preferably, the required movements to achieve verticality are communicated in terms of forwards and backwards movement and/or movement towards or away from the operator. For this purpose, the unit 107 is preferably pre-programmed with a default height of an upright (e.g. 2,400 mm) by which the angular departure from vertical sensed by the accelerometer can be converted to the requisite horizontal movement of the top of the upright. Optionally the height may be user-settable.

In one implementation, instructions for the operator may be included. By way of example the pre-recorded voice commands might include a colloquial message to the effect that the upright is vertical and should be fixed off (e.g. a pre-recorded message 'spot on; nail it') when the upright is within 2 mm of vertical. The same criteria may be applied to deactivating the amber lights whilst the green light remains illuminated.

When the upright is far, say more than 10 mm, from vertical the pre-recorded message may say 'pull towards you' or 'push away from you' (as appropriate). Likewise, the same criteria may be applied to the lights $R_1, R_2$.

As the upright is moved from beyond 10 mm away from vertical, the message may change to indicate that smaller movements are required, e.g. to indicate 'pull towards you a little bit' or 'push away from you a little bit'.

Of course audible indications other than pre-recorded (or otherwise synthesised) voice messages are possible. By way of example, a buzzer may sound when the upright is upright.

The unit 103 may optionally comprise further user-outputs 103' such as assistance LEDs and a buzzer. Preferably the unit 107 also includes a battery and a voltage regulator 121.

The unit 107 may communicate with the array 101 (and/or speaker 103) by any convenient means. Bluetooth is one option. A direct electrical contact when the unit 107 is fitted into its socket on the side of the spirit level (or otherwise attached to the side of the spirit level) is another option, although wireless communication is preferred.

The digital accelerometer used in a prototype of the spirit level is the NXP semiconductors MMA8451Q.

The MMA8451Q incorporates an advanced algorithm for orientation detection (ability to detect all six orientations) with configurable trip points. The embedded algorithm allows the selection of the mid-point with the desired hysteresis value.

The MMA8451Q orientation detection algorithm confirms the reliability of the function with a configurable Z-lockout angle. Based on known functionality of linear accelerometers, it is not possible to rotate the device about the Z-axis to detect change in acceleration at slow angular speeds. The angle at which the device no longer detects the orientation change is referred to as the Z-lockout angle. The device operates down to 14° from the flat position.

The actual orientation is determined by using the g force values calculated by the sensing device. There are threshold values that will generate a unique 1 or 0 value for each of the 6 positions. Once the final values are settled on after testing will go into a parameter group, who gets access to that group will authorised by the owners of the patents.

This is the final output table from those orientation calculations.

| Orientation Table | | | | | |
|---|---|---|---|---|---|
| Code | Orientation | Bit 3 | Bit 2 | Bit 1 | Bit 0 |
| 0 | Portrait Up | 0 | 0 | 0 | 0 |
| 1 | Landscape Right | 0 | 0 | 0 | 1 |
| 2 | Portrait Down | 0 | 0 | 1 | 0 |
| 3 | Landscape Left | 0 | 0 | 1 | 1 |
| 4 | Front | 0 | 1 | 0 | 0 |
| 5 | Back | 0 | 1 | 0 | 1 |
| 6 | Stable not level | 0 | 1 | 1 | 0 |
| 7 | Invalid not used | 0 | 1 | 1 | 1 |
| 8 | Level | 1 | x | x | x |

The invention is not limited to the examples described herein. Rather the invention is defined by the claims.

The arm 5 might advantageously be employed to mount devices other than spirit levels. By way of examples devices such as spotlights, rotary lasers and power boards may be equipped with an arm (and preferably an elongate body) for mounting in this way. Conversely a device mountable to an upright by any convenient means to convey fore-aft inclination to an operator in front of the upright would be advantageous. By way of example a rudimentary form of the device may comprise a conventional spirit level, a conventional G-clamp to mount the spirit level on the front of the upright, and a mirror to enable the relevant vial of the spirit level to be seen from in front of the upright.

The term 'comprises' and its grammatical variants has a meaning that is determined by the context in which it appears. Accordingly, the term should not be interpreted exhaustively unless the context dictates so.

The invention claimed is:
1. A device comprising:
a body, and
one, and only one, arm to mount the device on an upright;
wherein the body is an elongate body and comprises first contacting portions arranged to contact a front of the upright when the body is in a first orientation;
the arm is movable relative to the body
from a first position wherein the arm extends rearwardly beyond the first contacting portions to pass one side of the upright and engage a rear of the upright;
to a storage position wherein substantially all of the arm is within the body; and
the body is reversible relative to the upright, about an upright axis, from the first orientation to a second orientation;
the body comprises second contacting portions arranged to contact a front of the upright when the body is in the second orientation;
the arm is movable relative to the body from the first position to a second position in which the arm extends rearwardly beyond the second contacting portions to pass another side of the upright and engage the rear of the upright;
in each of the first position and the second position, the arm extends upwardly from the body and is movable, at least approximately about a horizontal axis, relative to the body to enable a weight of the body to tension the arm; and
the horizontal axis is within a range of one sixth to one half (inclusive) of a length of the body from a top of the body.

2. The device of claim 1 comprising:
a member;
an arm pivotal-connection by which the arm is mounted to pivot relative to the member;
a member pivotal-connection by which the member is mounted to pivot relative to the body, about a horizontal fore-aft axis.

3. The device of claim 2 wherein the arm pivotal-connection is above the member-pivotal connection.

4. The device of claim 2 comprising a detent to fix the member pivotal-connection to hold arm-pivotal connection horizontal.

5. The device of claim 4 wherein the detent is magnetic.

6. The device of claim 2 comprising: one or more resilient elements associated with the arm-pivotal connection and arranged to be loaded when the arm is pivoted away from the body.

7. The device of claim 6, wherein the arm and the member comprise features co-operable to axially load the one or more resilient elements when the arm is pivoted away from the body.

8. The device of claim 1, wherein the arm comprises a contact positioned to contact the rear of the upright and be in register with an upright centre of the body.

9. The device of claim 8, wherein the contact is a spike.

10. The device of claim 1, wherein the body has a fore-aft outer dimension in the range of 50 mm to 100 mm inclusive.

11. The device of claim 1, wherein the body has a transverse outer dimension in the range of 15 mm to 50 mm inclusive.

12. The device of claim 1, wherein a stud receiving capacity of the device is limited to studs having a fore-aft dimension of not more than about 152 mm.

13. The device of claim 1, comprising a signaler for signaling an indication of an orientation of the upright.

14. The device of claim 13, wherein the indication is interpretable by a user more than 1 metre in front of the upright.

15. The device of claim 13, wherein the signaler comprises one or more visual indicators positioned to be viewed from directly in front of the stud.

16. The device of claim 13, wherein the signaler is for audibly signaling.

17. A method of righting an upright;
the upright having a device mounted thereon;
the device comprising
a body, and
one, and only one, arm to mount the device on an upright; and
a signaler for signaling an indication of an orientation of the upright;
wherein the body is an elongate body and comprises first contacting portions arranged to contact a front of the upright when the body is in a first orientation;
the arm is movable relative to the body
from a first position wherein the arm extends rearwardly beyond the first contacting portions to pass one side of the upright and engage a rear of the upright;
to a storage position wherein substantially all of the arm is within the body; and
the body is reversible relative to the upright, about an upright axis, from the first orientation to a second orientation;
the body comprises second contacting portions arranged to contact a front of the upright when the body is in the second orientation; and
the arm is movable relative to the body from the first position to a second position in which the arm extends rearwardly beyond the second contacting portions to pass another side of the upright and engage the rear of the upright;
in each of the first position and the second position, the arm extends upwardly from the body and is movable, at least approximately about a horizontal axis, relative to the body to enable a weight of the body to tension the arm;
the horizontal axis is within a range of one sixth to one half (inclusive) of a length of the body from a top of the body; and
the method comprises moving, in response to the signaling, the upright.

18. The method of claim 17, wherein the moving comprises manipulating a brace running forwards and down from the upright.

19. A method comprising the use of a device mountable to an upright;
the device comprising a body and an arm;
the body being reversible relative to the upright, about an upright axis, from a first orientation to a second orientation;
the body comprising
first contacting portions arranged to contact a front of the upright when the body is in the first orientation; and
second contacting portions arranged to contact a front of the upright when the body is in the second orientation;
the arm being movable relative to the body
from a first position in which the arm extends rearwardly beyond the first contacting portions to pass one side of the upright and engage a rear of the upright;
to a second position in which the arm extends rearwardly beyond the second contacting portions to pass another side of the upright and engage the rear of the upright; and
in each of the first position and the second position, the arm extending upwardly from the body and being movable relative to the body to enable a weight of the body to tension the arm;
the method comprising orienting the body in the first orientation and positioning the arm in the first position to mount the device to a first upright; and
orienting the body in the second orientation and positioning the arm in the second position to mount the device to a second upright.

20. A device mountable to an upright;
the device comprising a body and an arm;
the body being reversible relative to the upright, about an upright axis, from a first orientation to a second orientation;
the body comprising
a first planar face arranged to contact a front of the upright when the body is in the first orientation; and
a second planar face arranged to contact a front of the upright when the body is in the second orientation;
the arm being movable relative to the body
from a first position in which the arm extends rearwardly beyond the first planar face to pass one side of the upright and engage a rear of the upright;

to a second position in which the arm extends rearwardly beyond the second planar face to pass another side of the upright and engage the rear of the upright; and in each of the first position and the second position, the arm extending upwardly from the body and being movable relative to the body to enable a weight of the body to tension the arm.

\* \* \* \* \*